UNITED STATES PATENT OFFICE.

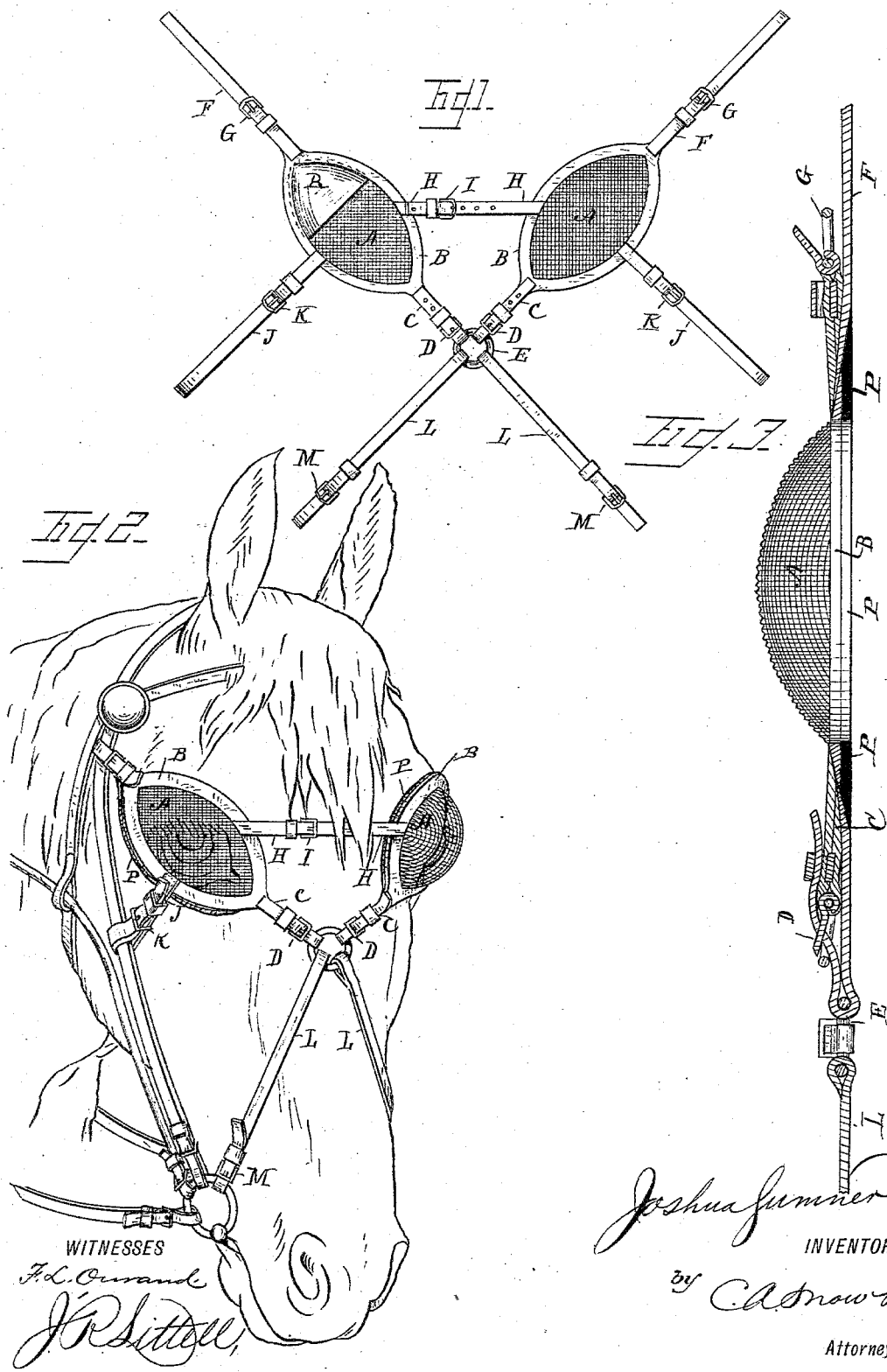

JOSHUA SUMNER, OF COLORADO SPRINGS, COLORADO.

SCREEN FOR PROTECTING THE EYES OF HORSES.

SPECIFICATION forming part of Letters Patent No. 287,885, dated November 6, 1883.

Application filed August 21, 1883. (No model.)

*To all whom it may concern:*

Be it known that I, JOSHUA SUMNER, a citizen of the United States, residing at Colorado Springs, in the county of El Paso and State of Colorado, have invented a new and useful Screen for Protecting the Eyes of Horses, of which the following is a specification, reference being had to the accompanying drawings.

This invention relates to screens for protecting the eyes of horses from flies and other insects; and it has for its object to provide a device which shall be simple, convenient, inexpensive, and effective for the purpose stated.

To this end it consists in certain improvements in the construction of the same, which will be hereinafter fully described, and particularly pointed out in the claims.

In the drawings hereto annexed, Figure 1 is a plan view of the device. Fig. 2 is a perspective view showing the same applied to the head of a horse, in position for operation; and Fig. 3 is a section on the line $x x$ in Fig. 1.

The same letters refer to the same parts in all the figures.

A A in the drawings represent a pair of screens, made, preferably, of woven or netted wire, of oblong or elliptical shape, to conform somewhat to the shape of the eyes of a horse, and concavo-convex or bulging, as shown. These screens are secured, by stitching or otherwise, to rims or frames B, of leather or other suitable material which shall be sufficiently pliable to enable the device to be fitted nicely upon the head of the animal without injury, and strong enough to brace and stiffen the screens. The under sides of the frames B are lined with pads P, of flannel, felt, or other soft material.

The inner corners of the frames B B are provided with straps and buckles C D, whereby they are connected adjustably to a ring, E. The outer corners of the frames B B are provided with straps and buckles F G, adapted to be adjustably connected with the headstall of the bridle. The upper sides of the frames B B are provided with straps H H, one of which has a buckle, I, whereby the said frames are adjustably connected together. The lower sides of the frames B B are provided with straps and buckles J K, adapted to be adjustably connected with the cheek-straps of the bridle.

The ring E is provided with downwardly-extending straps L L, having buckles M, whereby they may be adjustably connected with the bit-rings.

From the foregoing description, taken in connection with the drawings hereto annexed, the operation and advantages of this invention will be readily understood. By means of the system of straps herein described the device may be readily attached to the bridle and adjusted to the head of any horse. When once attached to the bridle, it may be left to remain upon the same when the harness is removed, and it will thus cause no trouble to those in charge of the horses. It will effectually shield the eyes of the animal from flies, and thus avoid the annoying jerking of the head, by which the animal usually endeavors to rid itself of these troublesome insects. When the screens are painted of a color to match the horse upon which they are used, they will appear in no wise unsightly, and they will effectively perform their intended function.

It may sometimes be found desirable to cover the upper half of the screens A with leather, metal, or other suitable material, to serve as blinders. This has been shown at R in Fig. 1 of the drawings. This construction is simple and effective, and enables ordinary blinders to be dispensed with.

I claim as my invention and desire to secure by Letters Patent of the United States—

1. In fly-screens for the eyes of horses, the combination of the screens A, flexible frames B, and soft lining-pads upon the under sides of said frames, as set forth.

2. As an improvement in fly-screens for the eyes of horses, the combination of the screens A, frames B, soft lining-pads upon the under sides of said frames, the straps and buckles C D F G H I J K L M, and the ring E, all arranged and operating substantially as and for the purpose set forth.

In testimony that I claim the foregoing as my own I have hereto affixed my signature in presence of two witnesses.

JOSHUA SUMNER.

Witnesses:
A. A. McGOVNEY,
E. J. EATON.